Dec. 25, 1928.

J. WEGNER 1,696,660

MACHINE FOR GRINDING OR CUTTING STONE

Filed Sept. 12, 1924  8 Sheets-Sheet 1

INVENTOR
Julius Wegner
BY
F. W. J. Bissing
ATTORNEY

Dec. 25, 1928.

J. WEGNER 1,696,660

MACHINE FOR GRINDING OR CUTTING STONE

Filed Sept. 12, 1924      8 Sheets-Sheet 2

Dec. 25, 1928. 1,696,660
J. WEGNER
MACHINE FOR GRINDING OR CUTTING STONE
Filed Sept. 12, 1924 8 Sheets-Sheet 4

Dec. 25, 1928.  
J. WEGNER  
1,696,660  
MACHINE FOR GRINDING OR CUTTING STONE  
Filed Sept. 12, 1924  8 Sheets-Sheet 8

INVENTOR  
Julius Wegner  
BY  
ATTORNEY

Patented Dec. 25, 1928.

1,696,660

UNITED STATES PATENT OFFICE.

JULIUS WEGNER, OF NEW YORK, N. Y.

MACHINE FOR GRINDING OR CUTTING STONE.

Application filed September 12, 1924. Serial No. 737,291.

This invention relates to a machine for working marble, stone and the like and more particularly to such a machine in which the work is supported on a reciprocating table and the grinder or cutting head is carried above it, means being provided for producing a relative feed between the work and the grinder head or cutting head.

Some of the objects of the invention are to provide means for reciprocating the table carrying the work, means for raising and lowering the crossrail which supports the carriage for the grinder or cutter, so as to adjust the grinder and so as to feed the grinder vertically when fluting columns, means for shifting the grinder or cutter carrying carriage on the crossrail, means for pivoting the grinder or cutter shaft, so that it will swing in a plane transverse to the table, means for swinging the grinder or cutter shaft around its driving axis and locking it in position, and means for automatically tilting the work to produce a swell or diminish, simultaneously with and proportionately to the vertical feed of the crossrail carrying the grinder or cutter carriage.

In accordance with the invention, a gear box is provided which reciprocates the table, raises and lowers the crossrail, shifts the grinder or cutter head carriage along the crossrail, tilts the turntable for producing the swell or diminish, the said gear box being constructed for a number of selective speeds for moving the parts in both directions.

With the above and other objects in view, my invention consists in the parts, improvements and combinations more fully pointed out hereinafter.

Referring now to the drawings, which illustrate one embodiment of the invention.

In the drawings, the frame of the machine is indicated at 1, the frame being provided with a pair of rails or tracks, 2, 3, on which the table 4, reciprocates. Means are provided for reciprocating the table (see Figs. 1 and 4). In the form of the invention illustrated, a shaft 5, is utilized to reciprocate the table, the shaft 5, carrying on its outer end the worm 6. The worm end of the shaft is mounted in bearings 7, 8, beneath the table, these bearings being supported by the frame of the machine. Worm 6, engages a rack 9, secured to the bottom of the table and running lengthwise thereto. As the shaft 5 is rotated and reversed the worm engaging the rack will smoothly and accurately reciprocate the table. Means are provided for driving the shaft 5, by power or adjusting it by hand. In the form of the invention illustrated, the driven end of shaft 5, is carried in a bearing 10, rigidly secured to the frame, this end of the shaft carrying a gear 11.

Figures 1, 22:
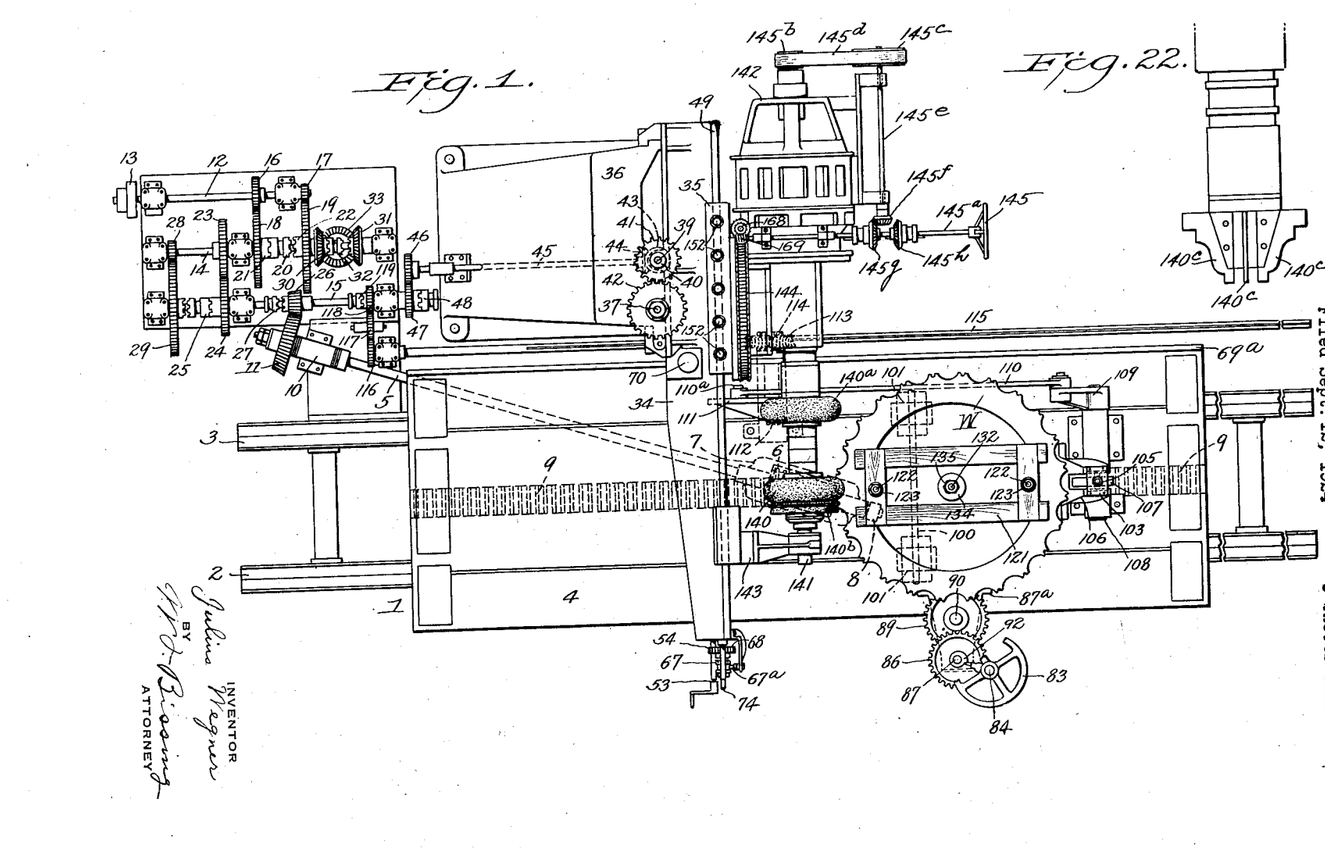
Figure 1 is a plan view of the grinding machine.
Figure 22, is a detail plan view showing the use of steel cutting knives for the rotary cutting head.
Figures 2, 3:
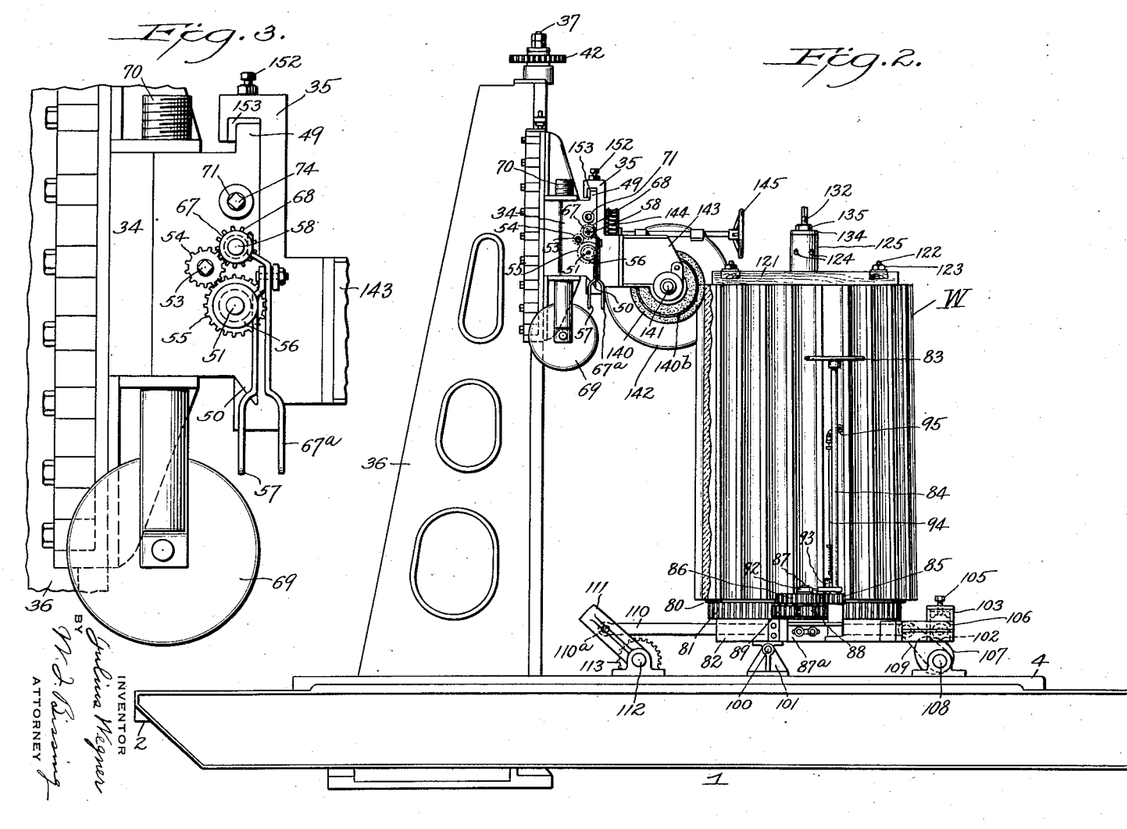
Figure 2, is a side elevation showing the crossrail and the grinder head and the columnar work on the turntable.
Figure 3, is an elevation of the means for shifting the grinder carriage, by hand.

A power operated gear box (see Fig. 1) is provided for driving the gear 11 in one direction or the reverse at the will of the operator. For this purpose a power shaft 12 is utilized carrying at one end the driving pulley 13. The power shaft 12, drives an intermediate shaft 14, and the intermediate shaft drives a countershaft 15, the shaft 15 in turn driving the shaft 5. Power shaft 12, is arranged to drive shaft 14 at either of two speeds. Gears 16 and 17 are secured to power shaft 12, these gears in turn meshing with gears 18, 19, which may be unclutched and free to rotate on a sleeve surrounding shaft 14. The sleeve carries gear 30. When clutch 20 which is slidingly keyed to said sleeve, is moved by hand to engage the clutch 21 on gear 18, as shown in Figure 1, gear 18, will turn the sleeve and gear 30, thru clutches 20, 21. When clutch 20 is thrown to the right of Figure 1, it will engage clutch 22 of the gear 19, freeing gear 18 and clutching gear 19 to the sleeve. Gear 30 drives shaft 14 thru clutch 32 splined to the shaft 14. In this way power shaft 12 may drive shaft 14 at a lower speed thru gears 17 and 19 or at a higher speed thru gears 16, 18.

Shaft 14 has secured to it, gear 23, which meshes with gear 24 on countershaft 15, gear 24 being normally loose on the countershaft. Gear 24, may be clutched to the countershaft by clutch 25, when the clutch is moved toward the right of Figure 1. Gear 26, normally free on shaft 15, may be clutched thereto by clutch 27 and meshes with gear 11 on the table shaft 5. In this way the table shaft 5, may be driven from power pulley 13, by means of gears 17, 19, 23, 24, 26 and 11, at a low speed or the table shaft 5, may be driven from power pulley 13 by means of gears 16, 18, 23, 24, 26 and 11, at a higher speed.

By means of gears 28 and 29, the latter of which may be clutched to countershaft 15, by sliding clutch 25, to the left in Figure 1, countershaft 15 may be driven from shaft 14 at a lower speed, so that with clutch 20 in engagement with gear 19, and with clutch 25, engaging gear 29, power shaft 12, will drive the table at the lowest speed. Clutch 20, engaging gear 19 and clutch 25 engaging gear 24, drives the table at the second speed, somewhat faster. With clutch 20, engaging gear 18, and with clutch 25, engaging gear 29, the table will be driven at a third faster speed and with clutch 20 engaging gear 18, and clutch 25, engaging gear 24, the table will be driven at its fastest speed.

Means are provided, for reversing the direction of feed of the table (see Fig. 1). The intermediate shaft 14 is reversed to secure this result. The reversing mechanism comprises gears 30, 31, gear 31 being normally loose on the shaft 14, and gear 30 secured to its sleeve which surrounds shaft 14. The beveled pinion 33 engages gears 30 and 31. By throwing clutch 32, to the right in Figure 1, gear 31 will drive the intermediate shaft 14, the said gear 31, being driven by gears 17, 19, 30 and 33. The direction of rotation imparted to shaft 14 by gear 31 is the reverse from that given to the shaft by gear 30, when gear 30 is clutched to shaft 14, by moving clutch 32 to the left. Intermediate shaft 14, having its direction reversed, will then reverse the direction of the drive of shaft 5, and will return the table. Manual means may be used for operating the clutches above referred to.

A crossrail member 34, is provided which carries a crossrail over and across which the carriage 35, carrying the rotary grinding head, is shifted (see Figs. 1-4 and Figs. 8-14). Means are provided for raising and lowering the crossrail member 34 by power or by hand. In the embodiment of the invention illustrated, the crossrail member is carried by a standard 36, which rises from the machine frame at one side. The crossrail member is thus supported and guided from a standard at one side of the machine and projects across the table. A hoisting screw 37, rotatably mounted in the standard 36, is provided for raising and lowering the crossrail, the screw 37, engaging the threaded sleeve 38, fixed to the back of the crossrail. Means are provided for rotating the screw 37 (see Fig. 4). In the form illustrated, a shaft 39, extends parallel to the hoisting screw 37, the shaft 39 carrying a clutch 40, so that gear 41, may be clutched to shaft 39, when desired. Gear 41 is in mesh with gear 42 on hoisting screw 37. On turning shaft 39, screw 37 will thus be rotated.

Figure 4:
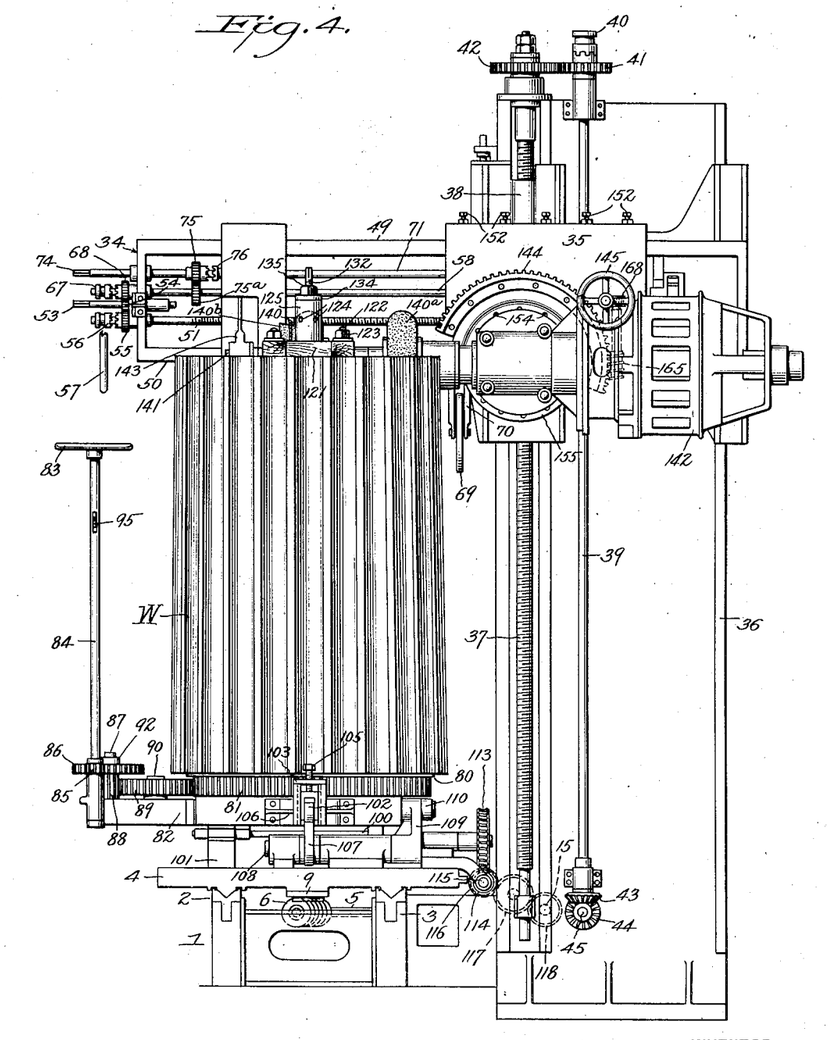
Figure 4, is an end elevation of the parts illustrated in Figure 2.

Means are provided for turning the shaft 39, by power or by hand. In the form illustrated, shaft 39, carries at its bottom, a bevel gear 43, which meshes with a bevel gear 44, the latter being carried by shaft 45. Shaft 45 is driven from the gear box and countershaft 15, by gears 46, 47, the latter being clutchable to shaft 15, by clutch 48. When clutch 48, is toward the left in Figure 1, gear 47, will be secured to shaft 15, and power shaft 12, will then turn shaft 45 in one direction or the other as desired thru countershaft
15. This driving of shaft 45 will in turn rotate hoisting screw 37, in one direction or the other, thus raising and lowering the crossrail member by power from the gear box. The shaft 39 may be turned by hand so as to raise or lower the crossrail member, by means described below.

As has been observed, means are provided for raising and lowering the crossrail member by hand, for shifting the carriage carrying the swiveled, rotary grinding head by hand along the crossrail member, for adjusting the work carrying table by hand and means are also provided for raising and lowering the profile roller by hand or by power.
The hand operation is accomplished from a convenient point at one end of the crossrail member.

These means will now be described (see Fig. 4 and Figs. 8-14). The grinder carriage 35 is shifted back and forth on the crossrails 49, and 50. A cross screw 51 whose ends are mounted in the crossrail member, is provided to shift the grinder carriage, the cross screw 51 engaging a screw block 52, the latter being secured to the back of the grinder carriage. Means are provided for rotating the screw 51 in either direction. As illustrated, the hand operated shaft 53 is mounted in one end of the cross rail member. It carries a gear 54, the said gear engaging a gear 55, which normally turns freely on the screw shaft 51. A clutch 56 operated by handle 57, will secure the gear 55, to the screw shaft when the handle is moved to the right in Figure 4. By then turning the squared end of shaft 53, by a hand crank, screw 51 may be rotated in either direction to correspondingly shift carriage 35.

Means are provided for shifting the carriage 35, by power. In the form illustrated, a rotatable countershaft 58, is provided whose ends are journaled in the crossrail member. The countershaft 58 may be turned by power from the gear box which drives shaft 45, the said shaft when driven turning upright shaft 39 thru gears 44, 43. Shaft 39 is provided with a spline and a gear 61 carried by the crossrail member, slides on the spline and turns with the shaft. The gear 61 meshes with the gear 62 on stub shaft 63, and a train of gearing 64, 65, 66, connects the stub shaft with the countershaft 58. The countershaft 58, may thus be driven by power from the gear box in either direction. Countershaft 58 carries a clutch 67 at one end which will secure the gear 68 on the countershaft to the shaft, when desired. By driving the countershaft 58, by power and clutching gear 68 to it, gears 68, 54 and 55, will be driven, thus rotating the screw shaft 51 in either direction, as desired, so as to shift the carriage 35, back and forth on the crossrail member.

The crossrail member may be raised and lowered by hand by means of a handcrank placed on the stub shaft 53, and by throwing in clutch 67, by handle 67ª. Gears 54, 68 will then drive the countershaft 58, which thru gears 64, 65, 66, will drive the gear 61 splined to the shaft 39. The shaft 39, by means of its clutch 40 and gear 41, will, when the clutch is operated, then turn gear 42, and rotate the hoisting screw 37. This enables the crossrail member to be raised and lowered by hand.

The work carrying table may be adjusted by hand by placing a crank on the squared end of the hand shaft 53 and by throwing in clutch 67 so as to connect its gear 68 with the shaft 58. The hand crank will then turn shaft 58 in either direction as desired, this in turn, thru the gearing 64, 65, 66, turning the shaft 39. Shaft 39, in turn will turn shaft 45, which when clutch 48 clutches gear 47 to shaft 15, will adjust the table shaft 5, by turning gears 26 and 11.

Means are also provided for adjusting the profile roller 69, which is carried by the crossrail member and which cooperates with a profile track 69ª, on the table, when desired to raise and lower the crossrail member—the hoisting screw 37 then being permitted to move bodily up and down by removing gear 42 and the set nuts at its top. The profile roller 69, (see Figs. 8 and 10) is mounted in the end of a screw 70, the screw passing thru the crossrail member and carrying a spline or key, which prevents the rotation of the screw. A shaft 71, carrying a worm 72, is provided, the worm engaging with a worm wheel 73, with a screw-threaded hub thru which the screw bolt 70 passes and with which it engages. When worm 73, is rotated in one direction or the other, by rotating the shaft 71, this will raise or lower the screw and profile roller. The shaft 71, may be driven directly by a handle placed on its squared end 74, or by power from stubshaft 63. In the latter case gear 75, engaging the gear 75ª, on shaft 58, is clutched to shaft 71 by hand operated clutch 76. Shaft 71 may thus be driven by power from the gear box by driving shaft 58 by power from the gear box, as above described, and by throwing in clutch 76. This will raise and lower, i. e. adjust the profile roller by power.

Means are provided for turning the work a predetermined amount, the means comprising a geared turntable and hand operated means for turning it, the turning means acting as a dividing head for turning columns thru a predetermined arc, when fluting them. As illustrated, (see Figs. 1 and 2 and 4 to 7) the work "W" consisting for example of a column to be vertically fluted, the flutes being uniformly spaced apart, is carried by a turntable 80. The turntable is provided with an annular gear 81 and is rotatably supported on a carrier plate 82, carried by the reciprocating table. A hand wheel 83, secured to shaft 84, carries a pinion 85, which engages gear 86, on intermediate shaft 87. Shaft 87, is mounted in standards 87$^a$, supported from the carrier plate 82, and carries gear 88, meshing with gear 89. Gear 89 is secured to intermediate shaft 90, also carried by standard 87$^a$, and engages annular gear 81. On turning the hand wheel a definite number of turns, the column is turned thru the arc between two flutes. The center distance between gears 85, 86, is such, so that by exchanging one or two gears, columns with various numbers of flutes can be formed or accommodated. The amount of turning motion is controlled by a stop bolt 91, engaging stop 92, carried by shaft 87. This stop bolt may be withdrawn by linkage 93, 94, 95, parts 94, 95 being carried by shaft 84. A spring 96, pushes the bolt into engagement with the stop.

Means are provided for automatically rocking or tilting the turntable and work so as to produce the swell or the diminish in the desired column sections, simultaneously with and in predetermined relation to the vertical feed of the cross-rail carrying the grinder carriage. In the form of the invention illustrated, (see Figs. 1, 2 and 7) the carrier plate 82, is pivoted at 100, upon brackets 101, carried by the table 4. At the far end of the carrier plate, a cam roller 102, is mounted in an adjustable box 103, which can be vertically adjusted by set screw 105, the box sliding in bracket 106, secured to the carrier plate. A cam 107 carried by shaft 108, carried in brackets supported by the table 4, is rocked by suitable means. As illustrated, the cam 107, carries crank 109, which is adjustably connected by link 110, and crank pin 110$^a$, to rock arm 111. Rock arm 111 is secured to shaft 112, which carries a worm wheel 113, and is driven by worm 114, slidably engaging the spline on shaft 115. Shaft 115 may be driven by power from shaft 15, thru gear 116, on shaft 115, gear 117 and gear 118 loose on shaft 15, but which may be clutched thereto by clutch 119. By throwing out clutch 27, and throwing in clutches 119 and 48, the shaft 115, for rocking the carrier plate and the shaft 45, for raising the cross member carrying the cutter carriage may be simultaneously operated so as to give a swell or diminish to the fluting in proportion to the feed of the cross member, the amount of the tilting may be adjusted by adjusting crank pin 110$^a$.

Figures 5, 6, 7:
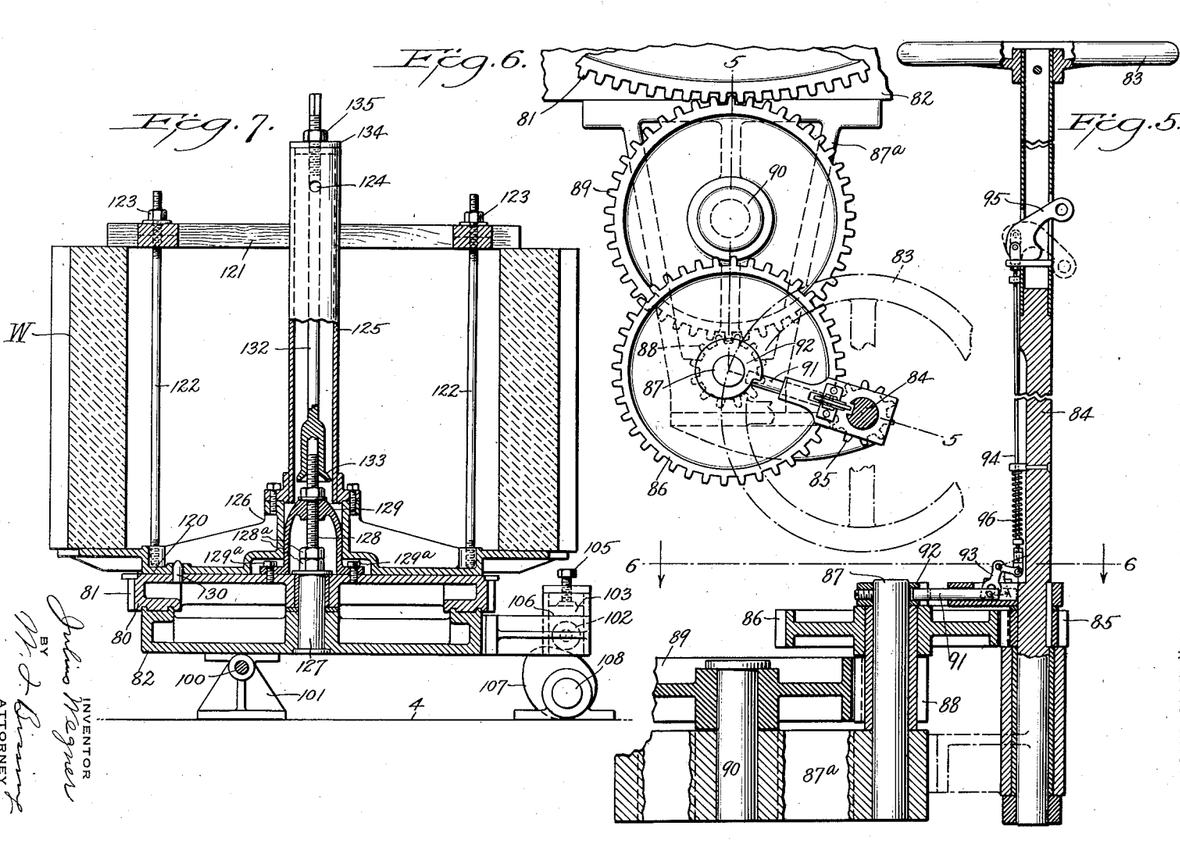
Figure 5, is a sectional detail view of the manual means for turning the turntable carrying the work, on line 5—5 of Figure 6.
Figure 6 is a transverse horizontal section on line 6—6 of Figure 5.
Figure 7, is a view largely in section, showing the supplementary turntable and part of the means for tilting the work to produce the swell or diminish.
Figure 8:
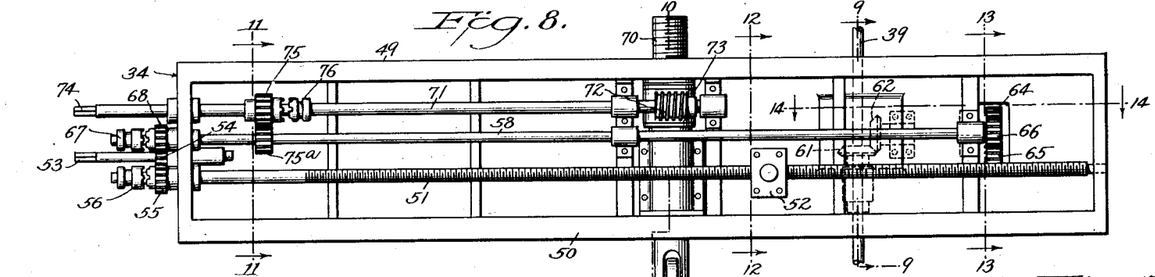
Figure 8, is a face view showing the crossrail member on which the grinder carriage reciprocates and the shafts for shifting the carriage.
Figure 9:
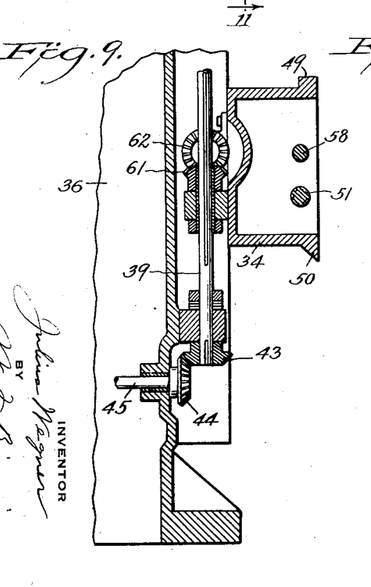
Figure 9, is a section on line 9—9 of Figure 8, showing the crossrail member and gears for driving one of the cross member shafts by power.
Figures 10, 11, 12, 13, 14:
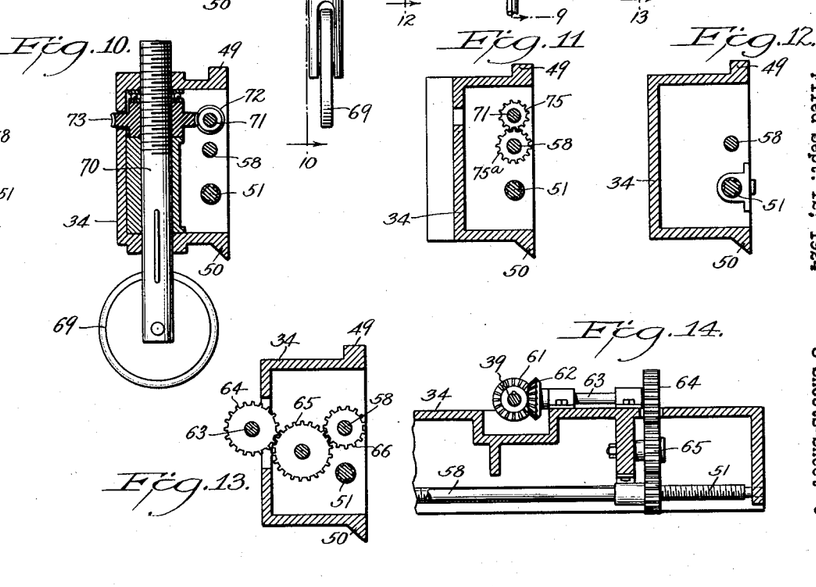
Figure 10, is a section on line 10—10 of Figure 8, thru the profile adjusting means.
Figure 11, is a detail cross-section on line 11—11 of Figure 8.
Figure 12, is a detail cross-section on line 12—12 of Figure 8, thru the screw block attached to the grinder carriage.
Figure 13, is a detail cross-section on line 13—13, of Figure 8.
Figure 14, is a transverse sectional view on line 14—14 of Fig. 8, showing the auxiliary shaft and gearing of the power driving mechanism for one of the horizontal shafts of the crossrail member.

In the form of the invention illustrated, in Figure 7, means are provided for preliminarily setting up a section of a column preparatory to placing it upon the turntable. This enables one section to be made ready for fluting or finishing while another section is being ground or cut. The parts are shown in Figure 7 in position after the column has been set up and placed upon the turntable. The work "W" is clamped between two supporting frames 120, 121, connected by tie rods 122, the frames being clamped tight upon the work by nuts 123. A derrick (not shown) then lifts the clamping frames and work over and upon the turntable 80, the lifting hook of the derrick engaging holes 124 in sleeve 125 attached to the lower ribbed frame 126. The carrier plate 82, is provided with a pivot king bolt 127, fixedly secured to it, the bolt being provided with an extension 128, by which turntable 80 is held down to its seat on carrier 82, by lock nut 128$^a$. A centering cone 129 may be clamped to turntable 80 by screws 129$^a$. As the derrick lowers the work holder with the central opening in frame 120, over the centering cone 129, which it frictionally fits, the cone will center the work holder. When finally lowered in place, pin 130, on the turntable passing thru an opening in frame 120, registers the work holder in place on the turntable and transmits the rotary motion of turntable 80 to the work holder 120.

Means are provided for clamping and unclamping the holder upon the turntable and for preventing rotation of the turntable while work is being fluted. As illustrated, (see Fig. 7) a sleeve 125 is secured upon the top of the central portions of the ribs of the lower frame 120. A clamping bolt 132 is dropped down upon the threaded end of center extension rod 128, the flanges 133, guiding the bolt upon the rod. A washer 134 and nut 135, transmit clamping pressure after the bolt 132 has been screwed upon rod 128. This clamps the work holder down upon the turntable and clamps the turntable, securing it from tipping, due to pressure of the grinding tool, when fluting the column. When it is desired to rotate the turntable, nut 135 is unscrewed and the hand wheel 83 is used to turn the table thru the desired arc.

Turning now to the grinder or cutter head, means are provided in accordance with my invention, for pivoting the grinder or cutter head driving shaft so that it will swing in a plane transverse to the table. The amount of swivelling movement may reach 135°. This enables the grinding to be done on the top of the work or the side and at an angle and also provides means for undercutting the work. A great advantage of this construction is that grinding wheels of small diameter can be used and very little preliminary grinder wheel dressing or trimming is required as the grinder head can be set on the angle of the moulding which is to be ground. With the grinder arranged horizontally, the columns may be fluted vertically by feeding the crossrail vertically by power, by means of the screw and driving shaft. Stops may be provided for limiting the swivelling movement of the grinder shaft. In the form of the invention illustrated, in Figures 1 to 3, the grinder heads 140, 140ª, are directly mounted on a motor driven shaft 141, driven by an electric motor 142, directly mounted on the shaft, whereas in Figure 15 et seq. (to be described below), the grinder head is mounted on a shaft parallel to and driven by the motor shaft. In both forms of the invention, the motor is carried by the pivoting means on which the motor shaft is mounted, so that the shaft and motor swing about the pivot when the grinder head is adjusted into position for grinding. The stone reciprocating table is reciprocable by power actuated means independent of the electric motor. In Figure 1, a bracket 143 may be used when a long spindle for the grinder head is utilized, so that it may be firmly supported in a horizontal position, permitting heavy cuts to be made in large mouldings. In Figures 1 and 4, the grinder shaft may be swung on its pivot by means of a worm gear segment 144, carried by the grinder carriage 35, with which engages a worm carried by the grinder shaft support, the said worm being turned by hand wheel 145. This hand wheel when turned will turn the worm and thus by the latter's engagement with the segment 144, swivel the grinder shaft, grinder and driving motor about their common pivotal connection with carriage 35—as will more fully appear in connection with the adjustment shown for the form illustrated in Figures 15, 16, 17 and 18. Hand wheel shaft 145ª, may be turned by power from motor 142 by belt pulleys 145ᵇ, 145ᶜ, and belt 145ᵈ, and countershaft 145ᵉ, carrying a bevel gear 145ᶠ, with which may engage either gear 145ᵍ or 145ʰ. These last two gears are splined to shaft 145ª and will rotate the shaft in one of two opposite directions when brought respectively into contact with driving gear 145ᶠ. This will turn the grinder shaft by power, about its pivot. In Figure 1, two grinding heads 140, 140ª, are shown, the head 140, having also a conical flange grinding portion 140ᵇ, for finishing the flat separating ribs of the columns between flutes and a cutting portion for cutting a groove between the flutes. Head 140ª, gives the preliminary cut to the flutes. Steel cutter blades 140ᶜ, may be mounted upon the grinder shaft and used for making the cut instead of the grinder head. These cutters may have the desired profile to give the requisite shape to the groove being cut.

Figures 15, 16, 23:
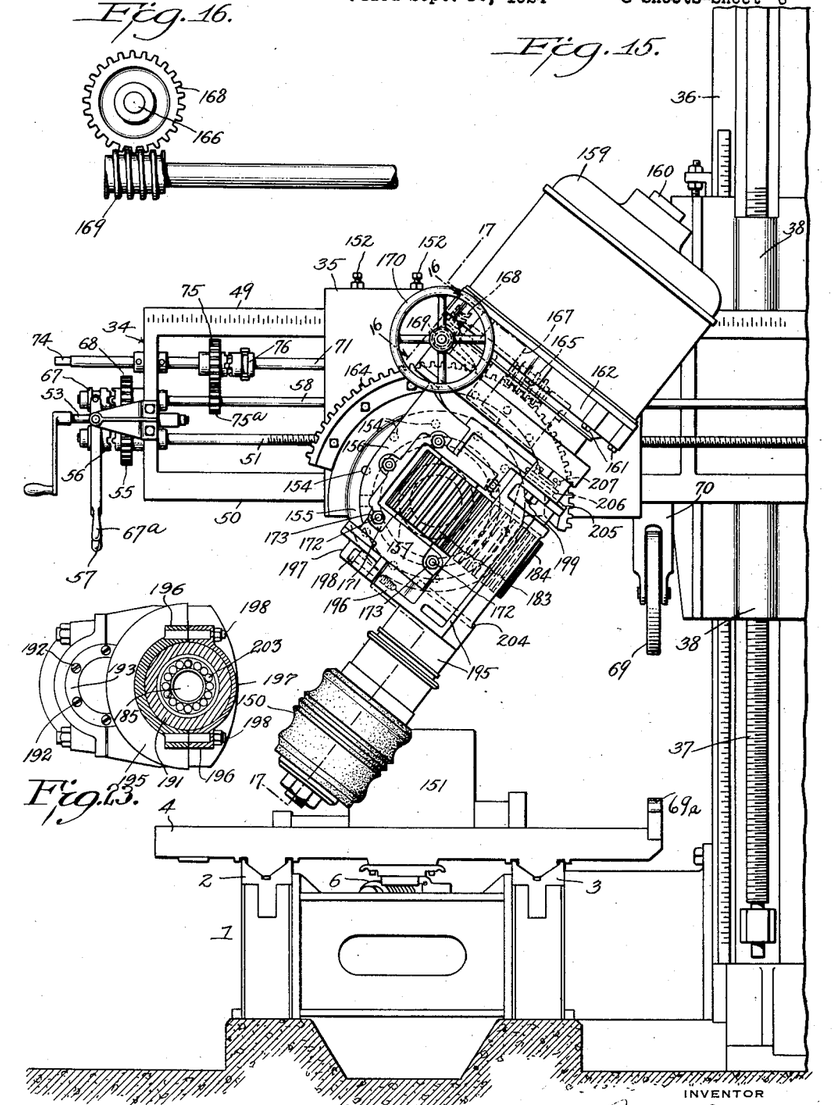
Figure 15, is a vertical elevation of another form of grinder head driving means, the grinder head being displaced from the power shaft and adjustable about it.
Figure 16, is a sectional detail on line 16—16 of Figure 15.
Figure 23 is a transverse section on line 23—23 of Figure 15.

Turning now to Figure 15 et seq. in which the grinder head 150, is shown, as grinding a moulding ornamental face on a flat strip 151 of marble, the same numbers are used when referring to the same parts previously illustrated and described. I have found it advantageous to project the grinding face of the grinder beyond the electric motor casing, so that the motor casing will not strike the work, which is being ground, while the shaft is in a horizontal position over a large flat piece of work with both motor and grinder above the work. The grinder carriage 35, which carries the grinder shaft and grinder driving mechanism, is mounted as before to slide on the crossrail member 34, lost motion being prevented by set screws 152 and cooperating filling piece 153.

Figures 17, 18:
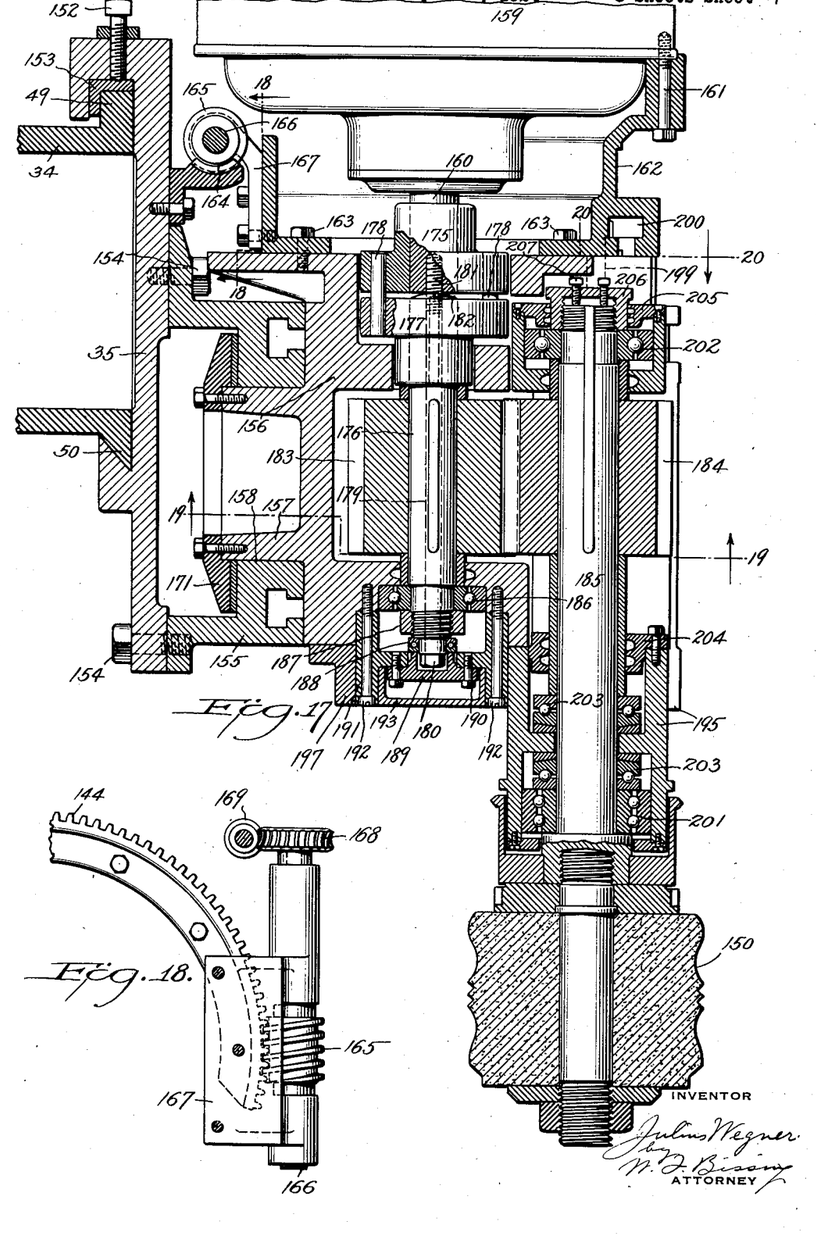
Figure 17, is a transverse sectional view on line 17—17 of Figure 15.
Figure 18, is a cross-sectional detail on line 18—18 of Figure 17, showing the means for swinging the grinder and the motor on their carriage.
Figure 19:
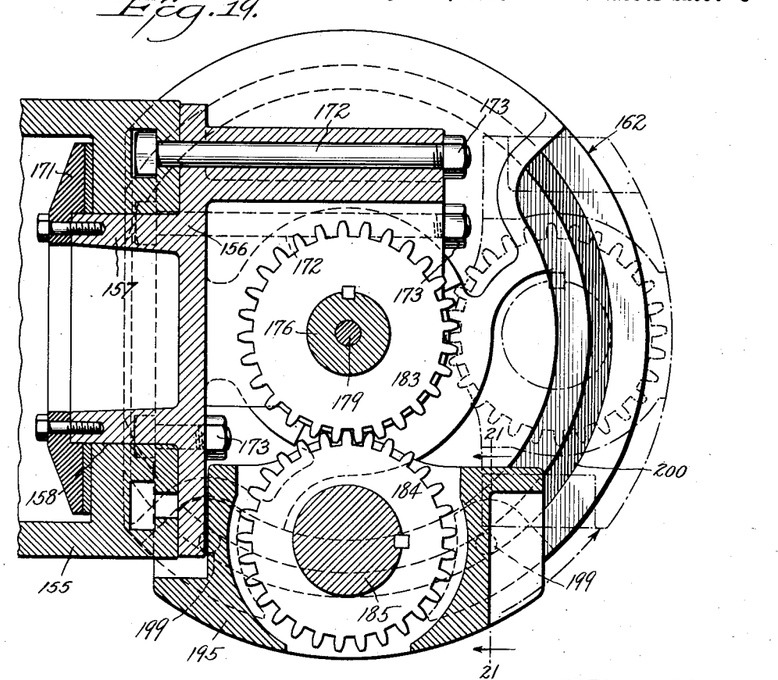
Figure 19, is a cross-section on line 19—19 of Figure 17, showing the means for adjusting the grinder head about its driving shaft.
Figure 20:
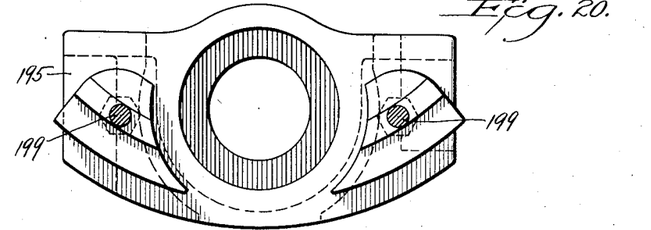
Figure 20 is a cross-section on line 20—20 of Figure 17, showing the holding means for the grinder head.
Figure 21:
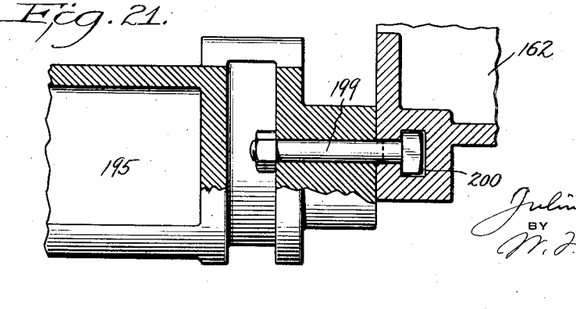
Figure 21, is a detail cross-section on line 21—21 of Figure 19, showing the holding means for the grinder head.

Upon the plate 35, there is mounted by bolts 154, a socket plate 155, forming a socket for the motor carrying frame 156, and where pivot 157, fits into a pivotal opening 158 of the socket plate. The motor 159, and its shaft 160, are securely mounted upon frame 156, by bolts 161, which connect the motor to a casting 162, which is secured to frame 156, by bolts 163. The motor carrying frame, motor and grinding head can be swiveled upon pivot 157, by means such as a worm wheel segment 164, bolted to plate 35, and worm wheel 165, engaging therewith and carried by shaft 166, mounted in plate 167, secured to the motor carrying casting 162. Shaft 166, carries worm wheel 168, engaging with worm 169, on the shaft of which is mounted hand wheel 170. Upon turning the hand wheel, the motor, its shaft and the grinding head are swiveled to the desired angular position, upon pivot 157. A cap plate 171 holds the pivot and motor carrying frame securely in place (see Figs. 17 and 19). Bolts 172, secure the frame 156, in adjusted angular position, the bolts having heads engaging sockets in the frame, and having nuts 173, which secure the bolts in place.

Means are provided for coupling the drive shaft to the motor shaft, permitting disconnection for repairs and means are also provided for taking up end play in the drive shaft. As illustrated, the motor shaft 160, carries keyed to it a cap 175. The drive shaft 176, which is hollow carries keyed to it, a cap 177. Dowel pins 178, loosely connect the caps so as to transmit the driving force from the motor shaft to the drive shaft, the dowels being fixed to one cap and falling slidingly into sockets of the other cap so as to allow for slight lack of alignment between shafts 160, and 176. A rod 179, with head 180, and threaded end 181, passes thru the hollow shaft, its end 181, screw threading into a threaded recess in shaft 160. The bolt thus forces the drive shaft with its rounded end 182, against shaft 160, the two shafts being thus locked together and the rounded end permitting the caps to accommodate themselves when the dowel pins 178, play in their sockets during the revolution of the shafts.

A pinion 183, is keyed to drive shaft 176, and drives the pinion 184, keyed to the grinder shaft 185. A ball bearing 186, supports the far end of the drive shaft, being secured to it by nut 187, the stationary raceway of the bearing being mounted in frame 166. A bearing 188, prevents end play of the drive shaft, being held in place by flanged cap 189, bolted by bolts 190 to hub 191, which is bolted by bolts 192 to frame 156. A dust cap 193, keeps out dust and dirt from the end of the shaft and bearing parts.

Means are provided for swinging the grinder shaft 185, carrying grinder head 150, about the drive shaft. This permits adjusting the grinding head to the work, keeping the grinder face beyond the motor casing, either when grinding horizontal pieces or vertical pieces of work. When grinding horizontally, the grinding head when adjusted about the drive shaft, occupies a position which is in certain cases about ninety degrees to its position when grinding vertically.

These means may be varied. As illustrated, shaft 185, is mounted in a frame 195, which carries a flanged bearing portion 196, embracing hub 191. A cooperating hub bearing cap 197, is bolted to flange 196, by bolts 198 (see Fig. 15). The frame may thus be swung around hub 191 by hand. When so adjusted, it is locked in position by bolts 199, carried by the frame and engaging recesses 200 in frame 162. Frame 195, carries supporting bearings 201, 202, for the grinder shaft and thrust bearings 203, for the shaft are also provided in the frame. Grooved bushings 204, 205, secured to the frame prevent access of dirt and escape of oil. A nut 206, locked by bolts 207, clamps bearings 202, 203 and 201, in place, and allows adjustment for wear of same.

It will be observed that either rotary cutting blades or a rotary grinder may be used for working on the stone, including marble and the like, and it will be understood that when in the claims, the term grinder or grinding head is used, the equivalent cutter is also included and designated thereby.

Having thus described the invention and its operation, it will be understood that changes may be made in carrying the invention into effect, without departing from the principles thereof.

What I claim is:

1. In a machine for grinding flat stone horizontally or fluting columns vertically, the combination of a table upon which the stone or column is supported, a rotary grinding head, a shaft carrying the grinding head, a carriage, means for transversely pivoting said shaft intermediate its ends to said carriage, so that the shaft may swing in a plane transverse to the table, from a vertical to a horizontal position, an electric motor carried by said pivoting means for driving said grinder shaft, a crossrail supporting said carriage, extending across the table, a vertical screw for raising and lowering said crossrail, power operated means for rotating said vertical screw, so as to feed the grinder vertically when the grinder shaft is in horizontal position when fluting columns, a screw for adjusting said carriage along the crossrail, across the work, and for holding the carriage in its adjusted position, and means independent of said electric motor for reciprocating said stone supporting table beneath said crossrail, at right angles to said plane.

2. In a machine for grinding flat stone or columns, the combination of a work table upon which the stone or column is supported, a grinding head, a shaft carrying the grinding head, means for transversely pivoting said shaft, a motor carried by said pivoting means for rotating the shaft by power, means for swinging said shaft and motor in a plane at right angles to the table, from a vertical to a horizontal position, a crossrail on which the grinding shaft is mounted, extending across the stone supporting table, a vertical screw for raising and lowering said crossrail, power operated means for rotating said screw, a screw for adjusting said shaft transversely on said crossrail and for holding the carriage in its adjusted position, and means independent of said motor for reciprocating said stone supporting table beneath said crossrail.

3. In a machine for grinding flat stones or columns, the combination of a table upon which the stone or column is supported, a grinder, a shaft carrying the grinder, a carriage, means for transversely pivoting said shaft to said carriage, so that the shaft may swing in a plane transverse to the table, from a vertical to a horizontal position, a swinging motor carried by the pivoting means for rotating the shaft so as to grind by power, a crossrail, a screw for adjusting said carriage transversely on the crossrail and for holding the carriage in its adjusted position, a vertical screw for raising and lowering the crossrail, a drive shaft parallel to said screw for driving it, means for driving said shaft, and means independent of said motor for reciprocating the work supporting table beneath said crossrail.

4. In a machine for grinding stone, the combination of a table upon which the stone is supported, a rotary grinding head, a shaft carrying the grinding head, a carriage, means for transversely pivoting said shaft intermediate its ends to said carriage, so that the shaft may swing in a plane transverse to the table, from a vertical to a horizontal position, an electric motor carried by said pivoting means for driving said grinder shaft, a crossrail supporting said carriage, extending across the table, a vertical screw for raising and lowering said crossrail, a screw for adjusting said carriage along the crossrail, across the work, and for holding the carriage in its adjusted position, and means independent of said electric motor for reciprocating said stone supporting table beneath said crossrail at right angles to said plane.

5. In a machine for grinding stone, the combination of a table upon which the stone is supported, a rotary grinding head, a shaft carrying the grinding head, a carriage, means for transversely pivoting said shaft intermediate its ends to said carriage, so that the shaft may swing in a plane transverse to the table, from a vertical to a horizontal position, an electric motor carried by said pivoting means for driving said grinder shaft, a crossrail supporting said carriage, extending across the table, a fixed standard on which said crossrail is supported and guided, a vertical screw for raising and lowering said crossrail, a screw for adjusting said carriage along the crossrail, across the work and for holding the carriage in its adjusted position, and means independent of said electric motor for reciprocating said stone supporting table beneath said crossrail at right angles to said plane.

6. In a machine for grinding stone, the combination of a reciprocating table upon which the stone is supported, a crossrail extending across the table, a screw for raising and lowering the crossrail, a carriage mounted to slide on said crossrail, a grinder, a shaft carrying the grinder, means for pivoting the shaft on said carriage, a motor carried by the pivoting means for rotating the shaft by power, mechanism connected with the pivoting means for swinging said shaft in a plane at right angles to the table from a vertical to a horizontal position, means independent of said motor for reciprocating said table, and a supporting bearing carried by said crossrail for the far end of the grinder shaft, disconnected from the grinder shaft when the shaft is vertical but connected therewith when the shaft is horizontal.

7. In a machine for grinding flat stone, the combination of a reciprocating work supporting table, means for reciprocating the table, a crossrail member mounted above and across the table, a carriage reciprocable along said crossrail member, a rotary grinding head, a shaft carrying it, a motor and motor driven shaft for rotating the grinder shaft, the grinder shaft being offset with relation to the motor shaft, the grinder shaft being adapted to carry a grinder whose face may project toward the work beyond the motor casing, both shafts and the power supplying motor being pivotally mounted on said carriage, the pivot being at right angles to the shafts and between the grinding head and motor, so that the shafts may swing transversely of the work from a vertical to a horizontal position.

8. In a machine for grinding flat stone, the combination of a reciprocating work supporting table, means for reciprocating the table, a crossrail member mounted above and across the table, a carriage reciprocable along said crossrail member, a rotary grinding head, a shaft carrying it, a motor and motor driven shaft for rotating the grinder shaft, said grinder shaft being parallel to, geared to and offset from said motor shaft, the grinder shaft being adapted to carry a grinder whose face may project toward the work beyond the motor casing, both shafts and the power supplying motor being pivotally mounted on said carriage, the pivot being at right angles to the shafts and between the grinding head and motor, so that the shafts may swing transversely of the work from a vertical to a horizontal position.

9. In a machine for grinding stone, the combination of a work supporting table, means for reciprocating it, a crossrail member mounted above the table, a carriage reciprocable along said crossrail member, a grinder head, a shaft carrying it, a motor and a shaft directly driven by said motor, and gearing between the grinder head shaft and motor shaft, said grinder head shaft being adapted to swing about the motor shaft.

10. In a machine for grinding stone, the combination of a reciprocating work supporting table, means for reciprocating it, a crossrail member mounted above the table, a carriage reciprocable along said crossrail member, a grinder head, a shaft carrying it, a motor and a shaft driven by said motor, said motor being parallel to said grinder head shaft, gearing between the grinder shaft and motor shaft, said grinder shaft and motor shaft being pivotally mounted on said carriage so as to swing transversely of the table, means permitting said grinder shaft to swing about the motor shaft and means for securing the grinder shaft in its adjusted, swung position about the motor shaft.

11. In a machine for grinding stone, the combination of a reciprocating work supporting table, means for reciprocating it, a crossrail member mounted above the table, a carriage reciprocable along said crossrail member, a grinder head, a shaft carrying it, a motor and a shaft driven by said motor, gearing between the grinder shaft and motor shaft, said grinder shaft and motor shaft being pivotally mounted on said carriage so as to swing transversely of the table, a swingable frame carrying the grinder shaft, said frame having a flanged bearing portion embracing a hub on the frame for the motor shaft, and means for securing the grinder head shaft in its adjusted, swung position about the motor shaft.

12. In a machine for grinding stone, the combination of a reciprocating work supporting table, means for reciprocating said table, a crossrail member mounted above the table, a carriage reciprocable along said crossrail member, a grinder head, a shaft carrying it, a motor and a shaft driven by said motor, gearing between the grinder shaft and motor shaft, said grinder shaft and motor shaft being pivotally mounted on said carriage so as to swing transversely of the table, means for securing said shafts in their position transverse to the table, means permitting said grinder shaft to swing about the motor shaft, and means for securing the grinder head shaft in its adjusted, swung position with relation to the motor shaft.

13. In a machine for grinding stone, the combination of a reciprocating work supporting table, means for reciprocating said table, a crossrail member mounted above and across the table, a carriage reciprocable along said crossrail member, a grinder head, a shaft carrying it, a motor and a shaft directly driven by said motor, gearing between the grinder shaft and motor shaft, said grinder shaft and motor shaft being parallel and pivotally mounted on said carriage so as to swing transversely of the table, the grinder shaft being offset with relation to said motor shaft, a fixed worm wheel segment carried by the carriage, a worm wheel shaft carrying a worm engaging therewith, and carried by the pivotal mounting for the grinder shaft, for swinging said shafts on said pivot.

14. In a machine for grinding flat stone or columns, the combination of a table upon which the stone or column is supported, a rotary grinding head, a shaft carrying the grinding head, a carriage, means for transversely pivoting said shaft intermediate its ends to said carriage, so that the shaft may swing in a plane transverse to the table, from a vertical to a horizontal position, an electric motor carried by said pivoting means for driving said grinder shaft, a crossrail supporting said carriage, extending across the table, a fixed standard on which the crossrail is supported and guided, a vertical screw mounted in said standard, for raising and lowering said crossrail, and a vertical shaft mounted in said standard parallel to said screw for driving it in either direction and power actuated means for driving said shaft in opposite directions.

15. In a machine for grinding flat stone or columns, the combination of a table upon which the stone or column is supported, a rotary grinding head, a shaft carrying the grinding head, a carriage, means for transversely pivoting said shaft intermediate its ends to said carriage so that the shaft may swing in a plane transverse to the table from a vertical to a horizontal position, an electric motor carried by said pivoting means for driving said grinder shaft, a crossrail supporting said carriage, extending across the table, a vertical screw for raising and lowering said cross rail, a vertical shaft parallel to said screw for driving it in either direction, a gear on said screw, and a gear on said shaft meshing therewith, means for clutching said latter gear to said shaft, and power actuated means for driving said shaft in opposite directions.

16. In a machine for grinding stone, the combination of a table upon which the stone is supported, a grinder, a shaft carrying the grinder, a carriage carrying the shaft, a motor carried by the carriage, for rotating the shaft by power, a crossrail member extending above and across the table, in which the carriage is supported for transverse movement, a screw in said crossrail member for feeding said carriage transversely to the work, a shaft in said crossrail member parallel to said screw, gearing connecting said crossrail shaft and screw, means for driving said crossrail shaft by power in either direction, thereby feeding said carriage, said means including a vertical power driven shaft, a gear slidably splined to said vertical shaft, and gearing carried by the said crossrail member and geared to said splined gear and to said crossrail shaft.

17. In a machine for grinding stone, the combination of a work supporting table, a vertically reciprocating crossrail member mounted above the table, a rotary grinder carried by said crossrail member, a motor carried by said crossrail member for rotating said grinder, a screw shaft extending along said member for shifting said grinder, a countershaft carried by said crossrail member, a shaft adapted to be driven by hand mounted on one end of said crossrail member, for driving said countershaft, a power shaft and a vertical shaft for driving said countershaft by power from the power shaft.

18. In a machine for grinding stone, the combination of a work supporting table, a vertically reciprocating crossrail member mounted above the table, a rotary grinder carried by said crossrail member, a motor carried by said crossrail member for rotating said grinder, a screw shaft extending along said crossrail member, a shaft adapted to be driven by hand mounted on one end of said crossrail member, gearing between said hand shaft and said screw shaft and between said hand shaft and said countershaft, a power shaft, a vertical shaft for driving said countershaft by power from the power shaft, means for reciprocating said table from said power shaft, and means for disconnecting said table from the driving power shaft, so as to permit the table to be reciprocated by hand from the hand shaft.

19. In a machine for grinding stone, the combination of a rockable table upon which the work is supported, a crossrail member above the table, a carriage carrying a rotary grinding head, mounted on said crossrail member, means for feeding said crossrail member vertically and means for rocking said work supporting table, so as to move the work against the grinder head simultaneously and in predetermined relation with the vertical feed of the crossrail member.

20. In a machine for grinding stone, the combination of a turntable upon which the work is supported, said turntable being mounted for a rocking movement, a hand wheel and gearing for rotating said turntable through a predetermined arc, a crossrail member above the table, a carriage carrying a rotary grinding head, mounted on said crossrail member, means for feeding said crossrail member vertically and means for rocking said turntable so as to move the work against the grinder head simultaneously with and in predetermined relation to the vertical feed of the crossrail member.

21. In a machine for grinding stone, the combination of a turntable upon which the work is mounted, means for rotating said turntable, a pivoted carrier plate supporting said turntable, a roller carried by the carrier plate, a cam cooperating with said roller, a rock arm for rocking said cam, a shaft for rocking said rock arm, a crossrail member mounted above the turntable, a carriage carrying a rotary grinding head, carried by the crossrail, and means for simultaneously feeding said crossrail member vertically and rocking said rock arm shaft, in predetermined relation to the feed of the crossrail member.

22. In a grinding machine for grinding flutes in columns, the combination of rockable means for supporting the column, a crossrail member above the column-supporting means, a carriage carrying a rotary grinding head mounted on said crossrail member, means for producing relative reciprocation between said grinding head and said column-supporting means, so as to flute the column, means for rocking said column-supporting means so as to move the column against the grinder head simultaneously with and in predetermined relation to the said relative reciprocation between the grinder head and the column-supporting means, so as to vary the depth of the flutes, and means for turning the said column-supporting means a predetermined amount after the completion of each flute grinding operation.

In testimony whereof, I have signed my name to this specification.

JULIUS WEGNER.